US010495142B2

(12) United States Patent
Bouron et al.

(10) Patent No.: US 10,495,142 B2
(45) Date of Patent: Dec. 3, 2019

(54) ROLLER BEARING COMPRISING OBLIQUE CONTACT ROLLERS

(71) Applicants: Cyril Bouron, Puits de Courson (FR); Herve Dondaine, Avallon (FR)

(72) Inventors: Cyril Bouron, Puits de Courson (FR); Herve Dondaine, Avallon (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/240,288

(22) Filed: Aug. 18, 2016

(65) Prior Publication Data

US 2017/0051786 A1  Feb. 23, 2017

(30) Foreign Application Priority Data

Aug. 18, 2015 (FR) ...................... 15 57777

(51) Int. Cl.
F16C 19/54 (2006.01)
F16C 33/58 (2006.01)
F16C 19/38 (2006.01)
F16C 19/36 (2006.01)

(52) U.S. Cl.
CPC ............ F16C 19/548 (2013.01); F16C 19/38 (2013.01); F16C 33/585 (2013.01); F16C 33/586 (2013.01); *F16C 19/362* (2013.01); *F16C 2300/14* (2013.01); *F16C 2352/00* (2013.01); *F16C 2360/31* (2013.01)

(58) Field of Classification Search
CPC ........ F16C 33/36; F16C 33/58; F16C 33/583; F16C 33/585; F16C 33/586; F16C 19/547; F16C 19/548; F16C 2300/14; F16C 2352/00; F16C 19/362; F16C 19/38; F16C 2360/31
See application file for complete search history.

(56) References Cited

U.S. PATENT DOCUMENTS

| 5,439,297 A | 8/1995 | Kitayama | |
| 9,188,154 B2 * | 11/2015 | Magny | F16C 19/38 |
| 9,188,161 B2 * | 11/2015 | Bouron | F16C 33/60 |
| 2014/0301684 A1 * | 10/2014 | Bouron | F16C 19/38 384/450 |
| 2014/0328555 A1 | 11/2014 | Kuo | |

FOREIGN PATENT DOCUMENTS

| JP | H0341217 A | 2/1991 | |
| JP | WO-2009020087 A1 * | 2/2009 | ............. F16C 19/38 |
| WO | 2013/029684 A1 | 3/2013 | |
| WO | WO2013029684 A1 * | 3/2013 | |

OTHER PUBLICATIONS

Machine Translation of WO 2009020087 dated Feb. 2009.*

* cited by examiner

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

The roller bearing provides an inner ring, an outer ring, and at least one row of oblique contact rollers arranged between bearing races, of the rings. Each of the rings provides a guide face, which is in contact with end faces, of the rollers. A point of intersection of the axis of rotation of each roller of the row with each guide face, of the rings is situated at an equal distance from inner, and outer, edges of the guide face.

8 Claims, 2 Drawing Sheets

ROLLER BEARING COMPRISING OBLIQUE CONTACT ROLLERS

CROSS REFERENCE TO RELATED APPLICATIONS

This application claims priority to french patent application no. 1557777 filed on Aug. 18, 2015, the contents of which are fully incorporated herein by reference.

FIELD OF THE INVENTION

The present invention relates to the field of roller bearings, in particular roller bearings comprising an outer ring, an inner ring, and at least one row of rolling elements, such as rollers, arranged between the ring.

BACKGROUND OF THE INVENTION

More particularly, the invention relates to the field of roller bearings with a wide diameter, in particular those used in wind power engines or tunnel drilling machines, such as tunnel boring machines or diggers.

BRIEF SUMMARY OF THE INVENTION

A roller bearing of this type generally provides two, inner and outer rings, and at least one row of oblique contact rollers arranged between bearing races of the rings, in order to withstand both axial and radial forces. A bearing of this type can also withstand high overturning moments. Bearings of this type with a large diameter, which are subjected both radially and axially to relatively large loads, are generally known as slewing bearings.

Patent application WO-A1-2012/126529 describes an slewing bearing comprising two rows of oblique contact rollers arranged between the inner and outer rings. Two guide faces are provided on each of the rings, in order to come into contact against the end faces of the rollers of each row.

With a bearing of this type, in operation, inclination or tilting of the rollers of each row may take place relative to the associated bearing races of the inner and outer rings. This gives rise to an increase in the friction torque between the rollers and the rings.

The objective of the present invention is to eliminate these disadvantages.

More particularly, the objective of the present invention is to provide a roller bearing which is easy to produce and economical, and has limited friction torque in operation.

According to one embodiment, the roller bearing provides an inner ring, an outer ring, and at least one row of oblique contact rollers arranged between bearing races of the rings. Each of the rings provides a guide face which is in contact with end faces of the rollers. The point of intersection of the axis of rotation of each roller of the row with each guide face of the rings is situated at an equal distance from inner and outer edges of the guide face.

The area of contact of the end face of each roller with the guide face of the inner ring can be in the form of a disc which is centered on the axis of rotation of the roller. The area of contact of the end face of each roller with the guide face of the inner ring can be in the form of a hoop which is centered on the axis of rotation of the roller.

Preferably, the end faces of the rollers are flat.

According to one embodiment, the diameter of the end faces of the rollers is smaller than the length of the guide faces of the inner and outer rings. The length of the guide faces can be smaller than the length of the bearing races of the inner and outer rings.

Preferably, the ratio between the gap provided between the guide faces of the rings and the end faces of the rollers, and the length of the rollers is between 5% and 6%.

According to one embodiment, the guide faces are formed directly on the inner and outer rings. The bearing can provide at least two rows of rollers.

BRIEF DESCRIPTION OF THE SEVERAL VIEWS OF THE DRAWING

The present invention will be better understood by studying the detailed description of an embodiment taken by way of example which is in no way limiting, and is illustrated by the appended drawings, in which.

DETAILED DESCRIPTION OF THE INVENTION

Figure 1:
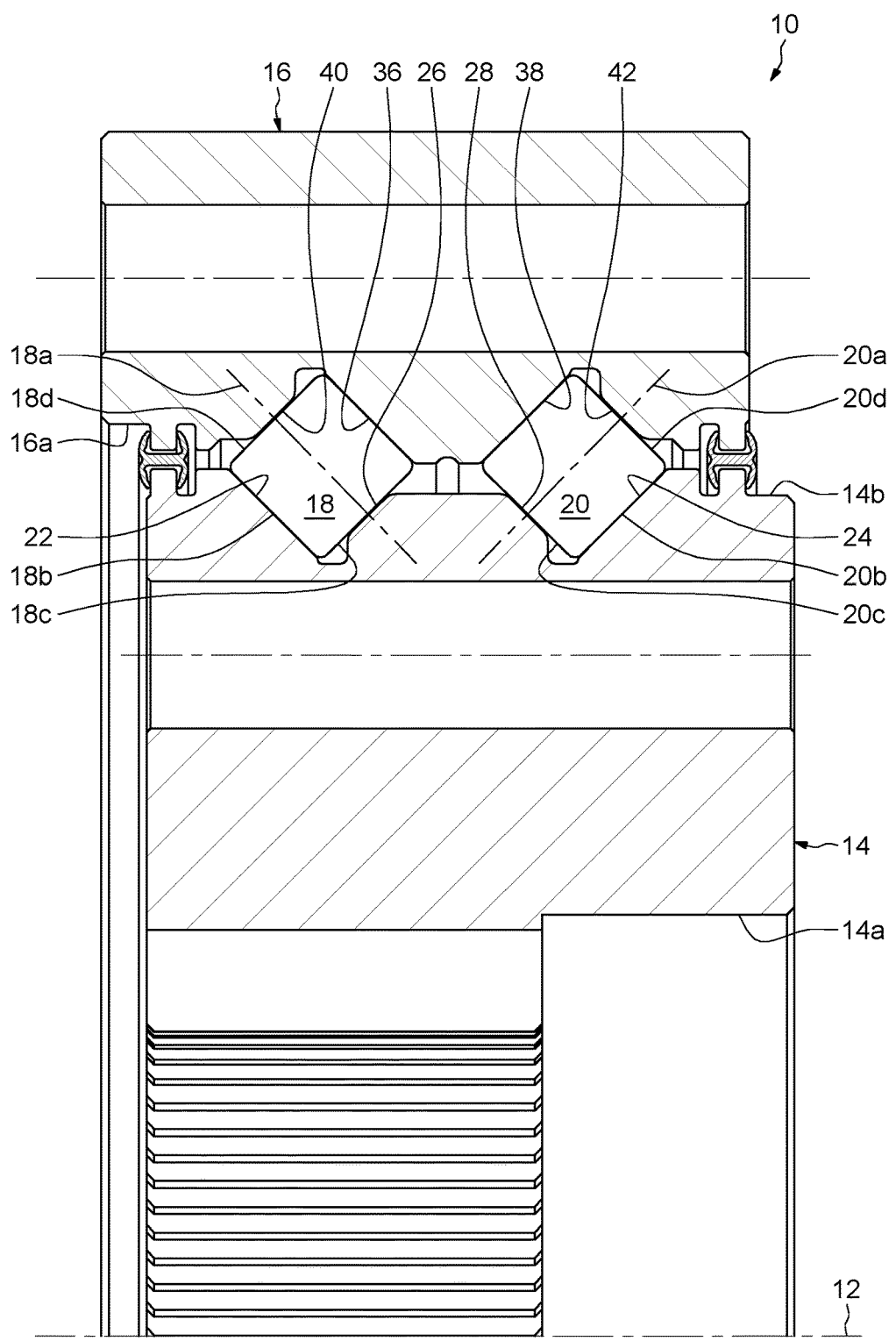
FIG. 1 is a view in axial cross-section of a roller bearing according to one embodiment.

In FIG. 1, the roller bearing, which has the reference 10 as a whole, can be used in particular in wind power engines or in tunnel drilling machines. The bearing 10, with an axis 12, provides an inner ring 14, an outer ring 16 and two rows of oblique contact rollers 18, 20 which are arranged between the rings. The bearing 10 also provides inserts (not shown) each arranged between two successive rollers 18, 20, in order to maintain a regular circumferential space between the rollers of each row.

The rollers 18, 20 are identical to one another. The rollers extend according to an axis 18a, 20a which forms an axis of rotation. The rollers 18, 20 each provide an outer rolling surface 18b, 20b, and two opposite end surfaces 18c and 18d, 20c and 20d, which delimit axially the outer surface of the bearing, taking into consideration the axis of rotation 18a, 20a of the roller. The end faces of the rollers 18, 20 are flat.

In the embodiment illustrated, the rolling surfaces 18a, 20a of the rollers are cylindrical. Alternatively, the rolling surfaces can have a spherical or logarithmic profile. For each row, the axes of rotation 18a, 20a of the rollers converge at a single point situated on the axis 12.

The inner 14 and outer 16 rings are concentric, and extend axially along the axis of rotation 12 of the bearing. The inner 14 and outer 16 rings are solid. A "solid ring" means a ring with a form which is obtained by machining with removal of shavings (turning, grinding) starting from forged and/or rolled blanks, bars or tubes.

In the embodiment illustrated, the inner ring 14 is made in a single piece. The inner ring 14 provides a bore 14a which is designed to be mounted on a frame or a structure of a machine (not represented). The inner ring 14 also provides a stepped outer surface 14b on which first and second annular inner bearing races 22, 24 are formed. The bearing races 22, 24 are symmetrical to one another relative to a transverse radial plane which passes between the rows of rollers 18, 20. Each bearing race 22, 24 is in the form of an annular crown. Each bearing race 22, 24 extends obliquely towards the interior from the cylindrical outer surface 14b. Each bearing race 22, 24 has in straight cross-section a straight profile which is in linear contact with the bearing surface 18b, 20b of each of the rollers 18, 20.

The inner ring 14 also provides annular guide faces 26, 28 which are formed on the outer surface 14b, and are designed to be supported axially with the end faces 18c, 20c of the rollers, taking into consideration the axes of rotation 18a, 20a. The guide faces 26, 28 are symmetrical to one another relative to the transverse radial plane which passes between the rows of rollers 18, 20. Each guide face 26, 28 is in the form of an annular crown which is continuous in the circumferential direction. Each guide face 26, 28 has in straight cross-section a straight profile. Each guide face 26, 28 is frusto-conical, and is arranged perpendicularly to the associated bearing race 22, 24, whilst being connected to the edge with a small diameter of the bearing race, in this case by means of a concave groove. Each guide face 26, 28 extends obliquely, and is connected to the outer surface 14b of the inner ring. The guide faces 26, 28 extend radially relative to the axes of rotation 18a, 20a of the rollers. Each guide face 26, 28 and the associated bearing race 22, 24 delimit a channel in the form of a "V" which is oriented radially towards the exterior.

In the embodiment illustrated, the outer ring 16 is produced in a single piece. The outer ring 16 provides a stepped bore 16a in which annular outer bearing races 36, 38 are formed. The bearing races 36, 38 are symmetrical, taking into consideration the transverse radial plane which passes between the rows of rollers 18, 20. Each bearing race 36, 38 is in the form of an annular crown. Each bearing race 36, 38 extends obliquely towards the interior from the bore 16a in the outer ring 16. Each bearing race 36, 38 has in straight cross-section a straight profile which is in linear contact with the bearing surfaces 18b, 20b of the rollers. The bearing races 22, 24 of the inner ring and the bearing races 36, 38 of the outer ring are respectively opposite one another, parallel and symmetrical, taking into consideration the axes of rotation 18a, 20a of the rollers. All of the rolling surface 18b, 20b of the rollers is in contact with the bearing races 22, 24 and 36, 38.

The outer ring 16 also provides annular guide faces 40, 42 which are formed in the bore 14a, and are designed to be supported axially with the end faces 18d, 20d of the rollers, taking into consideration the axes of rotation 18a, 20a. The guide faces 40, 42 are symmetrical to one another, taking into consideration the transverse radial plane which passes between the rows of rollers 18, 20. Each guide face 40, 42 is in the form of an annular crown which is continuous in the circumferential direction. Each guide face 26, 28 has in straight cross-section a straight profile. Each guide face 40, 42 is frusto-conical, and is arranged perpendicularly to the associated bearing race 36, 38. Each guide face 40, 42 extends obliquely towards the exterior from the bore 16a, and is connected to the edge with a small diameter of the associated bearing race 36, 38, in this case by means of a concave groove. Each guide face 40, 42 extends radially relative to the axes of rotation 18a, 20a of the rollers. Each guide face 40, 42 and the associated bearing race 36, 38 delimit a channel in the form of a "V" which is oriented radially towards the interior. The outer guide faces 40, 42 and the inner guide faces 26, 28 are respectively opposite one another, parallel and concentric.

The bearing race 22 and the guide face 26 of the inner ring define with the bearing race 36 and the guide face 40 of the outer ring a first annular space inside which the row of rollers 18 is arranged. Each roller 18 is mounted in direct contact with the bearing races 22, 36, and is retained laterally in position by the guide faces 26, 40.

Figure 2:
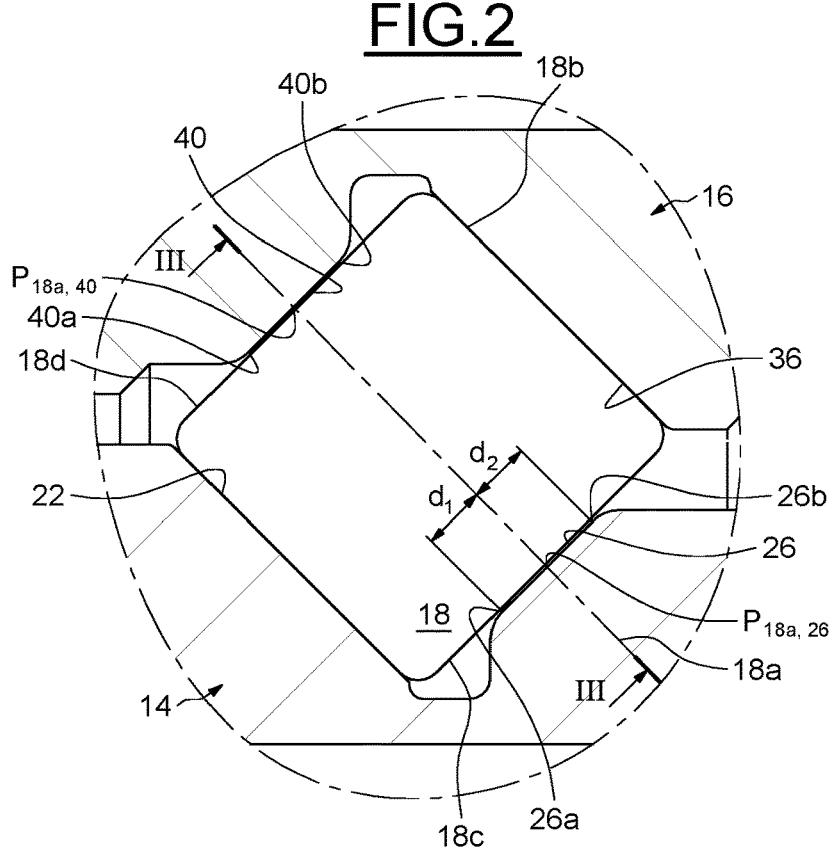
FIG. 2 is a detailed view of FIG. 1.

As illustrated more clearly in FIG. 2, each guide face 26, 40 which forms a support surface for the end faces 18c, 18d of each roller is delimited by an inner lateral edge 26a, 40a, and by an outer lateral edge 26, 40b. These edges are annular.

The point of intersection $P_{18a,\ 26}$ of the axis 18a of rotation of each roller with the guide face 26 of the inner ring is situated at an equal distance from the lateral edges 26a and 26b of the face. On an axial cross-sectional plane of the bearing 10, as illustrated in the figure, the radial distance $d_1$, taking into consideration the axis 18a, between the inner lateral edge 26a and the point of intersection $P_{18a,\ 26}$ is equal to the radial distance $d_2$ between the point of intersection and the outer lateral edge 26b. The sum of these two distances is equal to the length of the guide face 26. Similarly, the point of intersection $P_{18a,\ 40}$ of the axis of rotation 18a of each roller with the guide face 40 of the outer ring is situated at an equal distance from the lateral edges 40a and 40b of the face.

Thus, the area of contact of the end face respectively 18c, 18d of each roller with the guide face respectively 26, 40 is centred on the guide face and on the axis 18a of rotation of each roller. The tilting of the rollers 18 relative to the bearing races 22, 36 which can take place is limited.

Figure 3:
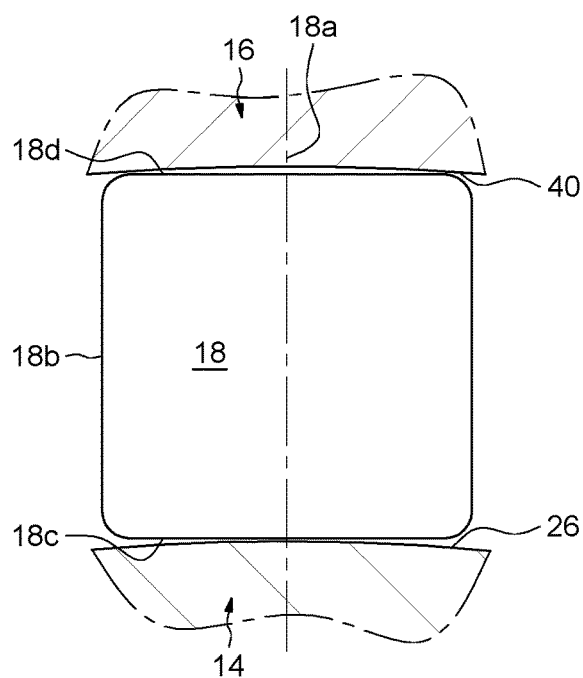
FIG. 3 is a view in partial cross-section according to the axis III-III in FIG. 2.

The area of contact of the end face 18c of each roller with the guide face 26 of the inner ring is in the form of a disc which is centred on the axis of rotation 18a of the roller. The area of contact of the end face 18d of each roller with the guide face 40 of the outer ring is in the form of a hoop which is centred on the axis of rotation 18a of the roller. As illustrated more clearly in FIG. 3, this area of contact in the form of a hoop is localized on the ridge which connects the end face 18d to the rolling surface 18b.

In order to limit the friction torque which is generated by the guiding of the rollers 18 via the faces 26, 40 of the rings, the ratio between the gap provided between these faces 26, 40 and the end faces 18c, 18d of the rollers relative to the length of the rollers is preferably between 5% and 6%. For this purpose, the diameter of the end faces 18c, 18d of the rollers is smaller than the length of the guide faces 26, 40 of the rings.

The bearing race 24 and the guide face 28 of the inner ring delimit together with the bearing race 38 and the guide face 42 of the outer ring a second annular space, inside which the row of rollers 20 is arranged. The rollers 20 are in direct contact with the bearing races 24, 38, and are retained laterally by the guide faces 28, 42. The arrangement of the rollers 20 relative to the bearing races 24, 38 and to the guide faces 28, 42 of the rings is the same as that described previously for the row of rollers 18.

In the embodiment illustrated, the bearing 10 provides two rows of oblique contact rollers 18, 20 arranged in the form of an "O". Alternatively, the rollers can be arranged in the form of an "X". The invention has been illustrated on the basis of a roller bearing provided with two rows of rollers arranged between the inner and outer rings. As a variant, it is possible to provide a single row of rollers or a number of rows equal to three or more.

The invention claimed is:
1. A roller bearing comprising:
an inner ring having a radially inwardly facing surface, wherein the radially inwardly facing surface comprises a first radially inwardly facing section and a second radially inwardly facing section, the first radially inwardly facing section being parallel and radially outward relative to the second radially inwardly facing section, wherein the first radially inward facing section defines a bore, an outer ring, and at least one row of oblique contact rollers arranged between bearing races of the rings, each of the rings having a guide face in contact with end faces of the rollers, when viewed in a first cross-section the inner ring defines a frustoconical shape with first and second sides and a top that forms the guide face, the first side being oriented axially relative to an axis of rotation of the roller bearing to form an axially extending radial surface such that the first surface is parallel to the axis of rotation, wherein when viewed in a second cross-section oriented ninety degrees from the first cross-section the top surface is arcuate to allow tilting of a roller in contact with the top surface relative to the top surface, a point of intersection of the axis of rotation of each roller of the row with each guide face of the rings is situated at an equal distance from inner and outer edges of the guide face, and wherein the ratio between a gap provided between the guide faces of the rings and the end faces of the rollers, and the length of the rollers is between five percent (5%) and six percent (6%).

2. The bearing according to claim 1, wherein the area of contact of the end face of each roller with the guide face of the inner ring is provided in the form of a disc that is centered on the axis of rotation of the roller.

3. The bearing according to claim 1, wherein the area of contact of the end face of each roller with the guide face of the outer ring is in the form of a hoop which is centered on the axis of rotation of the roller.

4. The bearing according to claim 1, wherein the end faces of the rollers are flat.

5. The bearing according to claim 1, wherein the length of the guide faces is smaller than the length of the bearing races of the inner and outer rings.

6. The bearing according to claim 1, wherein the guide faces are formed directly on the inner and outer rings.

7. The bearing according to claim 1, further comprising at least two rows of rollers.

8. The bearing according to claim 1, wherein the bearing comprises two rows of oblique contact rollers arranged between bearing races of the rings, when viewed in cross-section the inner ring defines a second frustoconical shape with third and fourth sides and a second top that forms a second guide face, the radial surface formed partially by the first side of the first projection also forming the third side of the second frustoconical shape such that the first and second guide faces are connected by a single radial surface.

* * * * *